(12) United States Patent
Rattner et al.

(10) Patent No.: US 7,555,544 B1
(45) Date of Patent: Jun. 30, 2009

(54) IMPLEMENTATION OF AFFINITIES IN HIGH AVAILABILITY COMPUTER SYSTEM CLUSTERS

(75) Inventors: Martin H. Rattner, Los Altos, CA (US); Nicholas A. Solter, Irvine, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1121 days.

(21) Appl. No.: 10/803,023

(22) Filed: Mar. 17, 2004

(51) Int. Cl.
*G06F 9/00* (2006.01)
*G06F 15/173* (2006.01)

(52) U.S. Cl. .................. 709/223; 709/224; 709/225; 709/226; 709/227; 709/201; 709/203; 714/41; 714/42; 714/43; 714/44; 711/150

(58) Field of Classification Search ......... 709/223–227, 709/201–203, 240, 241
See application file for complete search history.

(56) References Cited

U.S. PATENT DOCUMENTS

| 2003/0135724 | A1* | 7/2003 | Krishnamurthy et al. | ..... 712/245 |
| 2005/0108714 | A1* | 5/2005 | Geye et al. | .................. 718/100 |
| 2005/0204040 | A1* | 9/2005 | Ferri et al. | .................. 709/225 |

* cited by examiner

*Primary Examiner*—Jude J Jean-Gilles
(74) *Attorney, Agent, or Firm*—Osha • Liang LLP

(57) ABSTRACT

A system includes a cluster having a plurality of nodes wherein at least one of the nodes is a candidate node, a plurality of resource groups, a clustering mechanism executing on the cluster configured to activate a first resource group of the plurality of resource groups on the candidate node, and a resource group affinity of the plurality of resource groups, wherein the resource group affinity comprises a unidirectional association between the first resource group of the plurality of resource groups and a second resource group of the plurality of resource groups.

19 Claims, 4 Drawing Sheets

IMPLEMENTATION OF AFFINITIES IN HIGH AVAILABILITY COMPUTER SYSTEM CLUSTERS

BACKGROUND

Clustering of computer systems is becoming an increasingly popular way for enterprises and large businesses to ensure greater availability to multiple users. High Availability (HA) clusters are a class of tightly coupled distributed systems that provide high availability for applications by using hardware redundancy to recover from single points of failure. HA clusters typically include multiple nodes (i.e., computer systems) that interact with each other to provide users with various applications and system resources as a single entity. Each node typically runs a local operating system kernel.

In the event of a hardware or software failure, the HA cluster automatically restarts applications on the same node or "fails over" (i.e., restarts applications on a different node) the applications in order to keep applications available to clients of the cluster. Conventionally, the cluster software is responsible for starting/restarting applications on one or more nodes of the cluster.

Individual software components on the HA cluster are configured as resources. A resource may be any component that is capable of readily being relocated from one node to another node. Typical examples of a resource may be disk volumes, network addresses, software processes, etc. A group of resources that run together on the same node is known as a resource group. When the cluster is initially booted and following any type of failure that takes a resource group offline (i.e., the resource group is no longer running on the node), the resource group is started on one or more nodes to make services available to users. To facilitate the restarting of resource groups on different nodes, each resource group typically includes a list of nodes, i.e., a nodelist, upon which the resource group can run. The nodelist is typically created in order of preference, with the most preferred node occurring first on the list. The nodelist is one of several properties of a resource group.

Alternate methods to increase the availability of resources within an HA cluster are always being developed. One such method involves the creation of resource group dependencies. Dependencies indicate that a first resource group cannot be started until a second resource group (for which the first resource group has a dependency) has already been activated on a particular node.

Resource group dependencies may include components (e.g., properties, associations) that describe the dependencies. For example, typical components may include the category of the dependency, the location of the dependency, the type of dependency, etc. Moreover, these components may be further defined with specific details (e.g., specific locations, types, or categories), which adds to the complexity of the dependencies. In this case, the clustering software uses an algorithm to satisfy all the dependencies when activating a particular resource group on a given node. If this is not possible, services of the resource group remain offline and are unavailable to end users.

SUMMARY

In general, in one aspect, the invention relates to a system. The system includes a cluster having a plurality of nodes wherein at least one of the nodes is a candidate node, a plurality of resource groups, a clustering mechanism executing on the cluster configured to activate a first resource group of the plurality of resource groups on the candidate node, and a resource group affinity of the plurality of resource groups, wherein the resource group affinity comprises a unidirectional association between the first resource group of the plurality of resource groups and a second resource group of the plurality of resource groups.

In general, in one aspect, the invention relates to a method to activate a first resource group. The method involves determining a plurality of candidate nodes for the first resource group, eliminating any of the plurality of candidate nodes that violates a strong affinity of the first resource group, to generate a plurality of affinity candidate nodes, determining a composite value for each of the plurality of affinity candidate nodes, and sorting the plurality of affinity candidate nodes based on a pre-defined priority using the composite values to obtain a sorted list.

In general, in one aspect, the invention relates to a computer system for activating resource groups. The computer system includes a processor, a memory, a storage device, and software instructions stored in the memory. The software instructions enable the computer system under control of the processor to determine a plurality of candidate nodes for the first resource group, eliminate any of the plurality of candidate nodes that violates a strong affinity of the first resource group to generate a plurality of affinity candidate nodes, determine a composite value for each of the plurality of affinity candidate nodes, and sort the plurality of affinity candidate nodes based on a pre-defined priority using the composite values to obtain a sorted list.

Other aspects of the invention will be apparent from the following description and the appended claims.

DETAILED DESCRIPTION

Figure 1:
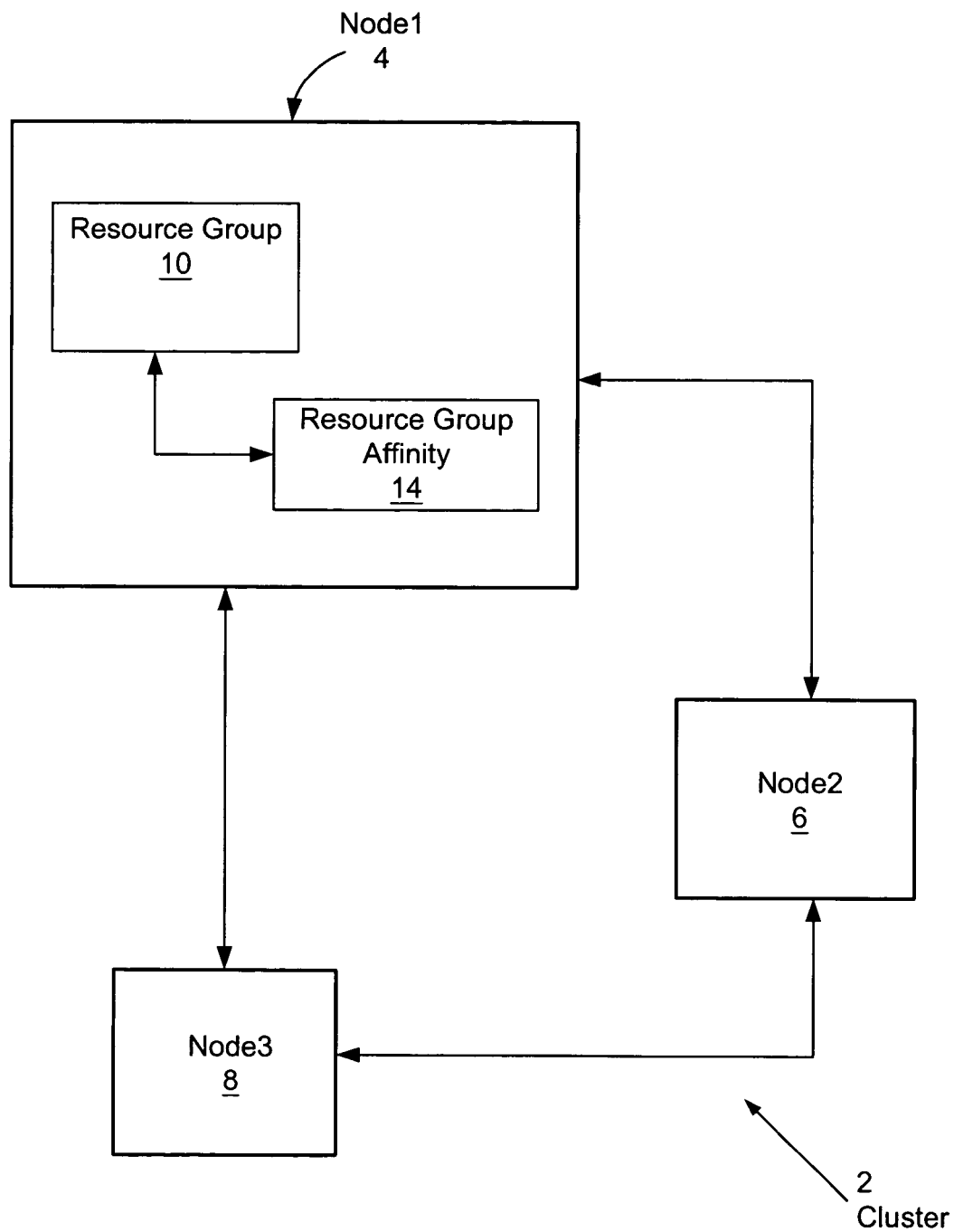
FIG. 1 shows a flow diagram of the components within a high availability cluster in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, one or more embodiments of the invention relate to providing an enhancement of the process by which a clustering software chooses nodes on which resource groups are activated (i.e., bring online so that one or more services of the resource group are available to users). More specifically, embodiments of the invention introduce a resource group affinity, which may be used to determine on which node of a high availability cluster a given resource group is activated.

FIG. 1 shows a flow diagram of the components of a high availability cluster (2) (hereinafter referred to as a "cluster") in accordance with one embodiment of the invention. Typically, the cluster (2) includes multiple nodes (e.g., Node1 (4), Node2 (6), Node3 (8)). Node1 (4) includes a resource group (10) with various software components (or resources) that run together on the same node. The resource group (10) may also provide one or more services to users of the cluster. The resource group (10) may include several properties such as a nodelist property, a resource group name, a resource group description, a "failover" policy (i.e., a policy that states whether to restart a resource group on a different node once the resource group has failed on the current node), etc.

A resource group (10) is considered "activated" if the resource group is currently running, or is in the process of being brought online on a particular node. Additionally, the node on which a resource group (10) is online is considered the "master" of that resource group (10). For example, if the resource group (10) is online on Node1 (4), then Node1 (4) is the master of the resource group (10).

One skilled in the art will appreciate that while the discussion of FIG. 1 focuses on one resource group within a node, several resource groups may exist within a node. Additionally, a particular resource group may have more than one master (i.e., a resource group may be online on multiple nodes). Additionally, one skilled in the art will appreciate that other nodes, e.g., Node2 (6) and Node3 (8), may include similar components as shown in Node1 (4). Specifically, in one embodiment of the invention, Node2 (6) and Node3 (8) may include one or more resource groups with each resource group having various properties. Moreover, each resource group may be associated with a resource group affinity, as described below.

In one embodiment of the invention, a resource group (10) within a node, e.g., Node1 (4), is associated with a resource group affinity (14). The resource group affinity (14) defines a behavior of the resource group (10) within the node (4) of the cluster (2). In one embodiment of the invention, a resource group affinity (14) is associated with a resource group (10) by a system administrator (or anyone else managing the cluster) resulting in a resource group affinity (14) between a first resource group (RG1) and a second resource group (RG2).

In one embodiment of the invention, resource group affinities may contain various components, including the name of the resource group for which another resource group holds an affinity, the affinity type, and the affinity strength. The combination of affinity types and strengths, in accordance with an embodiment of the invention, forms five separate kinds of resource group affinities that describe the association between resource groups. The five resource group affinities include a strong positive affinity, a strong negative affinity, a weak positive affinity, a weak negative affinity and a mutual strong positive affinity. Each of these resource group affinities are discussed in detail below. One skilled in the art will appreciate that a particular resource group may hold only one of these affinities for another resource group. Any given resource group affinity is a direct relationship that may be thought of as a direct arrow pointing from the "affinitent" (i.e., the resource group from which the affinity is pointing) to the "affinitee" (i.e., the resource group to which the affinity is pointing). For example, if RG1 has a strong positive affinity for RG2, then RG1 is the affinitent and RG2 is the affinitee.

A positive resource group affinity expresses that the clustering software should attempt to activate a given resource group on a node that is a current master of another resource group. A strong positive affinity, e.g., RG1 holds a strong positive affinity for RG2, is an affinity where RG1 must only run on nodes where RG2 is also running. In other words, RG1 and RG2 should have the same master. If no such node is available, then RG1 must remain offline. A weak positive affinity, e.g., RG1 holds a weak positive affinity for RG2, indicates that the clustering software should attempt activation of RG1 on a node where RG2 is running, but if this attempt fails, then RG1 may be activated on a node that violates the weak affinity.

In contrast, a negative resource group affinity expresses that the clustering software should attempt to activate a resource group on a node that is not a current master of another resource group. A strong negative affinity, e.g., RG1 holds a strong negative affinity for RG2, is an affinity where RG1 must only run on nodes where RG2 is not running. If this is not possible, then RG1 must remain offline. A weak negative affinity, e.g., RG1 holds a weak negative affinity for RG2, indicates that the clustering software should attempt to activate RG1 on a node where RG2 is not running, but if this attempt fails, RG1 may be activated on a node where RG2 is currently running.

In one embodiment of the invention, a particular resource group may initiate a "failover" of itself when one of the services within the resource group fails or cannot make itself available to users. Each resource within a resource group is given a monitor, which is a separate process that monitors the activity of the service(s) provided by the resource. When the resource group is activated on a node, the resources and monitors for each resource group are also activated. A failover is typically invoked by a resource group when one of the monitors detects that the service provided by a particular resource (within the resource group) is unhealthy, i.e., the service provided is showing performance degradation. In order to restore the health of the service, the resource group initiates a failover to restart the resource group on a different node.

The aforementioned resource group affinities allow the possibility for changes in the status of the affinitee to impose changes upon the affinitent. For example, if RG1 has a strong positive affinity for RG2, and RG2 invokes a failover from node N to node A, then RG1 also follows RG2 to node A. Similarly, if RG1 has a strong negative affinity for RG2, and RG2 invokes a failover to node N (that is currently the master of RG1), then RG1 is re-located to a different node than RG2.

Another kind of resource group affinity that a particular resource group may hold for another resource group is known as the mutual strong positive (MSP) affinity. Typically, the MSP affinity operates in the same way that strong positive affinities operate; however, the MSP affinity allows for changes in the status of the affinitent to impose changes upon the affinitee, which is not allowed by the strong positive affinity. Specifically, consider the case where RG1 has a strong positive affinity for RG2 and both resource groups have the same master node N. In this case, if RG2 invokes a failover from node N to node M, then RG1 follows RG2's location. However, RG1 is unable to invoke a failover to a different node and must remain on node N because of the strong positive affinity that RG1 holds for RG2. In other words, RG1 does not have the power as the affinitent to "drag" RG2 to a different node. In contrast, if RG1 possesses an MSP affinity for RG2, then the power to drag RG2 is given to RG1. The MSP affinity of RG1 for RG2 is not a completely symmetric relationship. Although either resource group can invoke a failover and "drag" both groups onto a new master, only RG2 can be activated by itself (i.e., without RG1 on the same master).

Figure 2:
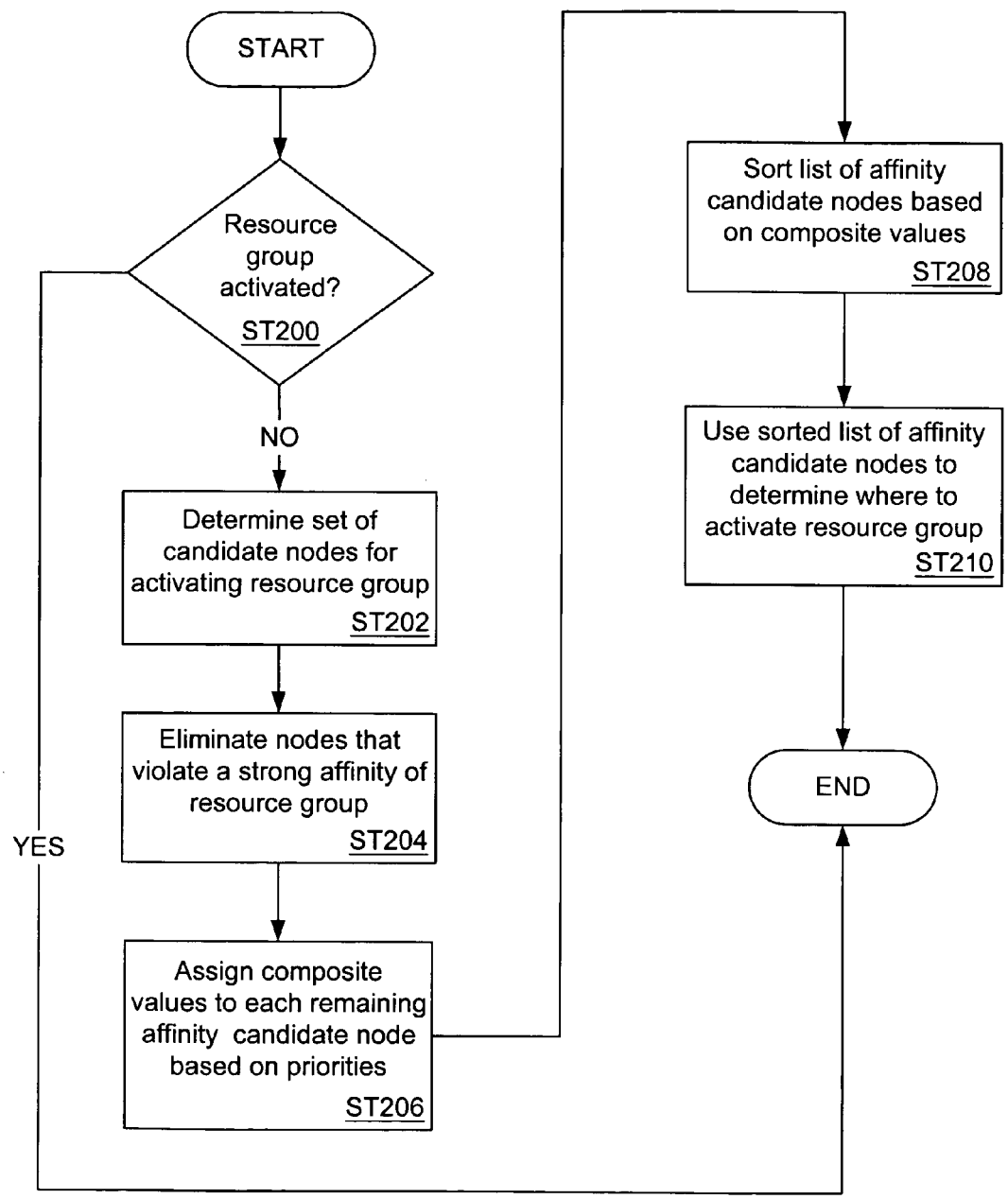
FIG. 2 shows a flow chart for a process to determine a node on which to start a resource group in accordance with one embodiment of the invention.

FIG. 2 shows a flow chart for the process of determining on which node to activate a particular resource group. Typically, a resource group is activated on a node after a failover or when the cluster is booting. Initially, a threshold determination is made whether the resource group is already activated on the desired number of master nodes specified for the resource group (Step 200). If the resource group is activated on a sufficient number of nodes, then the process ends.

However, if the resource group requires activation on a new master, then the set of candidate nodes for activating the resource group is determined (Step 202). The requirements to be a candidate node include: 1) the candidate node is a member of the cluster; 2) the candidate node is included on the resource group's nodelist property; and 3) the resource group is not already running on the candidate node. Once the list of possible candidate nodes is determined using this criteria, the elimination process begins.

A candidate node is eliminated from the list of candidate nodes if activation of the resource group on that particular candidate node would violate a strong affinity of the resource group (Step 204). For example, if node N contains a resource group for which the resource group has a strong negative affinity, node N is eliminated from the possible candidate list. Similarly, if the resource group holds a strong positive affinity for another resource group, any node that is not the master of the other resource group is eliminated from the possible candidate list. Upon completion of this process a list of affinity candidate nodes is generated. Next, composite values are assigned to the affinity candidate nodes based on a prioritizing criteria (Step 206).

Figure 3:
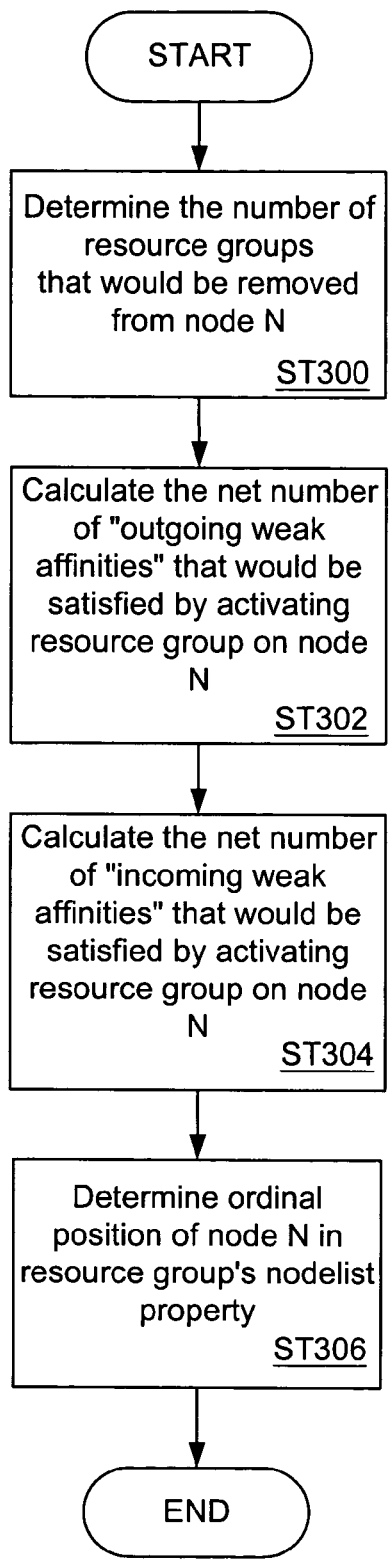
FIG. 3 shows a flow chart for a process to determine the priority of nodes to start a resource group in accordance with one embodiment of the invention.

FIG. 3 shows the process of assigning composite values to the affinity candidate nodes in accordance with one embodiment of the invention. In one embodiment of the invention, the composite values are calculated and assigned to the each affinity candidate node. Initially, the number of resource groups that would be removed from the node on which the resource group is activated is determined (Step 300). This value includes resource groups that declare a strong negative affinity for the resource group and, as a result, would have to be relocated to a new master. Additionally, any resource groups that hold a strong positive affinity for those that declare a strong negative affinity for the resource group would also be relocated to a new master.

Subsequently, the net number of "outgoing weak affinities" that are satisfied by activating the resource group on node N is calculated (Step 302). Outgoing weak affinities are weak affinities declared by the resource group for other resource groups. Similarly, the net number of "incoming weak affinities" that would be satisfied by activating the resource group on node N is calculated (Step 304). Incoming weak affinities are weak affinities for the resource group declared by other resource groups. More specifically, calculating the outgoing weak affinities and incoming weak affinities includes calculating a net "affinity satisfaction score," which is described below. The affinity satisfaction score is based on both the number of weak affinities that are satisfied on node N and the number of weak affinities that are violated on node N (i.e., by activating the resource group on node N).

To calculate the total affinity satisfaction score for outgoing weak affinities of the resource group, the score is initially started at a value of zero. For each resource group A (RGA) for which the resource group has a weak positive affinity, one point is added to the total score if RGA is currently online on node N. Similarly, one point is subtracted from the total score if RGA is currently not online on node N. For each resource group B (RGB) for which the resource group has a weak negative affinity, one point is subtracted from the total score if RGB is currently online on node N. In this case, no points are added or subtracted from the total score if RGB is not currently online on node N.

Similarly, for incoming weak affinities, an affinity satisfaction score is calculated by adding one to the total score for each RGA that is currently online on node N and has a weak positive affinity for the resource group. For each RGB that has a weak negative affinity for the resource group, one point is subtracted from the total score if RGB is currently online on node N. For incoming weak affinities, the total affinity satisfaction score remains unchanged if RGA or RGB is not currently online on node N.

In this manner, the affinity satisfaction score effectively adds up the number of weak affinities that would be satisfied and subtracts the number of weak affinities that would be violated if the resource group were activated on node N. Subsequently, the ordinal position of node N in the resource group's nodelist property is also calculated by referring to the resource group's nodelist property (Step 306).

Returning to FIG. 2, affinity candidate nodes are then sorted based on the composite values assigned in Step 206 (and as described above) to obtain a sorted list (Step 208) in accordance with one embodiment of the invention. One skilled in the art will appreciate that the composite values and the order in which the composite values are applied to obtain the sorted list may vary.

Sorting occurs based on the priority of each composite value assigned to the affinity candidate nodes. A first priority is placed on maximizing the number of outgoing weak affinities that are satisfied. Thus, the node N with the largest number of outgoing weak affinities directed to the resource group is placed earlier in the sorted list. For nodes with equal values of outgoing weak affinities, the affinity candidate node N with the smaller number of resource groups that would be removed are placed next (i.e., a second priority) in the sorted list. For affinity candidate nodes with equal values of both the aforementioned composite values, the node N with the larger value of incoming weak affinities is a third priority in the sorted list. The ordinal position for the affinity candidate node N in the resource group's nodelist property is the fourth priority, and factors into the sorting process only for nodes with equal values of all the aforementioned composite values. One skilled in the art will appreciate that a first priority is considered the highest priority while the fourth priority is considered the lowest priority.

Next, in one embodiment of the invention, the resource group's nodelist is replaced by the sorted list of affinity candidate nodes and used to determine where to activate the resource group (Step 210). Thus, the process of determining on which node to activate a particular resource group is complete.

In one embodiment of the invention, when multiple resource groups need to be assigned new masters at the same time, the clustering framework sorts the list of resource groups such that each resource group in the list has no strong affinities for any resource group that follows on the list. That is, the first resource group in the list has no strong affinities for any other group in the list, and the second resource group in the list has no strong affinities for any resource group that follows on the list, though the second resource group may have a strong affinity for the first resource group, etc. This way, "less constrained" resource groups are assigned a master first. For example, if RG1 declares a strong positive affinity for RG2, then RG2 is less constrained than RG1 and is assigned its master first. The affinitent RG1 is more constrained because the strong affinity directed toward RG2 allows RG1 to only be activated where RG2 is already activated.

The following examples illustrate various implementations of the invention. These examples are intended only to show one or more of the aforementioned embodiments and are not intended to limit the scope of the invention.

In one embodiment of the invention, if a system administrator requests to switch a resource group activated on a given node, the clustering software does not permit the action to be performed if a strong positive or strong negative affinity of that resource group is violated. Rather, an error message is produced informing the system administrator why the action is not permitted. Subsequently, the administrator may try a different node or edit the affinities of the resource group to permit the intended action.

In one embodiment of the invention, when RG1 stops executing on node N either due to failover or due to administrative request, then the clustering software takes additional actions based upon any strong affinities involving RG1. For example, if RG2 has a strong positive affinity for RG1, then RG2 also stops executing on node N. If a resource group 3 (RG3) has a strong negative affinity for RG1, then RG3 may be started on node N because RG1 is no longer running on node N.

In one embodiment of the invention, affinities may be used to enhance the functionality of the cluster system. For example, if two services, represented by RG1 and RG2, can run on separate nodes but could run more efficiently when on the same node, a weak positive affinity may be assigned between RG1 and RG2. This way, the likelihood that RG1 could run on the same node as RG2 is increased, while still allowing RG1 to run on a different node in the event of a failover of RG2. If such a failover occurs, the cluster maintains availability of the RG1 service while sacrificing some performance.

In one embodiment of the invention, affinities may be used to balance the load across multiple nodes. For example, a system administrator may want to achieve load balancing between multiple resource groups, so that the groups are evenly distributed among the available nodes. In this case, for each resource group, the system administrator may assign a weak negative affinity of the resource group for all other resource groups. This achieves the desired load distribution by assigning each resource group to the "least loaded" node because the fewest other resource groups are running on that node. Thus, the smallest number of weak negative affinities would be violated.

Figure 4:
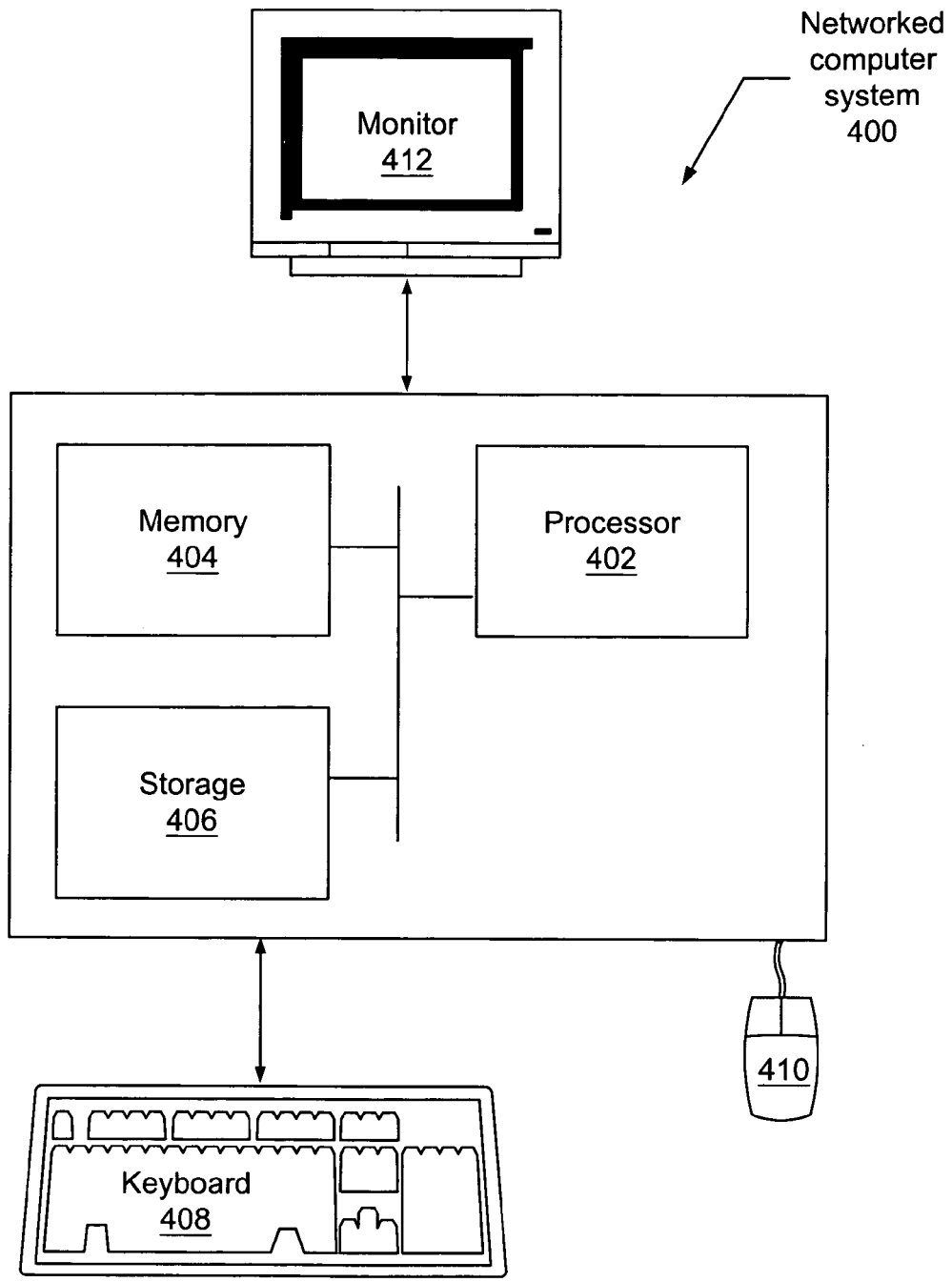
FIG. 4 shows a computer system in accordance with an embodiment of the invention.

The invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). Those skilled in the art will appreciate that these input and output means may take other forms. Further, those skilled in the art will appreciate that one or more elements of the aforementioned computer (400) may be located at a remote location and connected to the other elements over a network.

Embodiments of the invention may include a restriction in the graph of strong affinities (i.e., strong positive, strong negative affinities, and mutual strong affinities) that states that the graph includes no cycles. In other words, a chain of strong affinities is not permitted to "loop back" to the resource group from which the strong affinity originated. Due to this restriction, the algorithm to assign composite values to affinity candidate nodes has the ability to make a single pass through the list of affinity candidate nodes to assign weighting factors to each node, followed by a sort of those nodes based upon the weighting factors. Accordingly, the algorithm of the invention provides efficiency and is guaranteed to terminate. Moreover, the algorithm is simple and easily understood by users because of the limited number of affinity possibilities (i.e., strong positive, strong negative, weak positive, weak negative, and mutual strong positive).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a cluster having a plurality of nodes, wherein each of the plurality of nodes is a computer system comprising hardware and software configured to execute on the hardware, wherein the software is stored on the hardware, and wherein at least one of the nodes is a candidate node;
a plurality of resource groups;
a clustering mechanism executing on the cluster configured to activate a first resource group of the plurality of resource groups on the candidate node; and
a resource group affinity of the plurality of resource groups, wherein the resource group affinity comprises:
a unidirectional association between the first resource group of the plurality of resource groups and a second resource group of the plurality of resource groups,
an affinity type for defining the resource group affinity of the first resource group to the second resource group, wherein the affinity type is one selected from a group consisting of a positive affinity type and a negative affinity type, wherein the positive affinity type indicates that the clustering mechanism should attempt to activate the first resource group on a same node as the second resource group, and wherein the negative affinity type indicates that the clustering mechanism should attempt to activate the first resource group on a different node than the second resource group, and
an affinity strength defining a degree of the affinity type of the resource group affinity, wherein the affinity strength is one selected from the group consisting of a strong affinity strength, a weak affinity strength, and a mutual strong affinity strength.

2. The system of claim 1, wherein the plurality of resource groups comprises:
a plurality of resources configured to provide at least one service; and
a monitor configured to observe the activity of the at least one service.

3. The system of claim 1, wherein the first resource group is activated on the same node as the second resource group when the resource group affinity comprises one selected from the strong affinity strength and the mutual strong affinity strength and the positive affinity type.

4. The system of claim 3, wherein the first resource group follows the second resource group if the second resource group changes nodes or goes offline.

5. The system of claim 1, wherein the first resource group is activated on the different node than the second resource group when the resource group affinity comprises the strong affinity strength and the negative affinity type.

6. The system of claim 5, wherein the first resource group relocates to another node if the second resource group moves to the same node as the first resource group.

7. The system of claim 1, wherein the first resource group may be activated on the same node as the second resource group when the resource group affinity comprises the weak affinity strength and the positive affinity type, but if an attempt fails, the first resource group may be activated on the different node than the second resource group.

8. The system of claim 1, wherein the first resource group may be activated on the different node than the second resource group when the resource group affinity comprises the weak affinity strength and the negative affinity type, but if an attempt fails, the first resource group may be activated on the same node as the second resource group.

9. The system of claim 1, wherein the first resource group is activated on the same node as the second resource group and the first resource group is able to move the second resource group to the different node when the resource group affinity comprises the mutual strong affinity strength and the positive affinity type.

10. The system of claim 1, wherein a least constrained resource group of the plurality of resources groups is activated prior to more constrained resource groups.

11. The system of claim 10, wherein a first of the plurality of resource groups has no strong affinities for any other resource group and a second of the plurality of resource groups has no strong affinities for any resource group that follows the second of the plurality of resource groups.

12. A method to activate a first resource group comprising:
determining a plurality of candidate nodes for the first resource group, wherein each of the plurality of candidate nodes is a computer system;
eliminating any of the plurality of candidate nodes that violates a strong affinity of the first resource group, to generate a plurality of affinity candidate nodes, wherein the plurality of candidate nodes are eliminated based on a negative affinity type of a resource group affinity of the first resource group to a second resource group, wherein the negative affinity type and a strong affinity indicate that the first resource group must be activated on a different node than the second resource group;
determining a composite value for each of the plurality of affinity candidate nodes;
sorting the plurality of affinity candidate nodes based on a pre-defined priority using the composite values to obtain a sorted list;
determining a number of resource groups that are removed from one of the plurality of affinity candidate nodes when the first resource group is activated on the one of the plurality of candidate nodes;
calculating the net number of outgoing weak affinities satisfied when the first resource group is activated on the one of the plurality of candidate nodes;
calculating the net number of incoming weak affinities satisfied when the first resource group is activated on the one of the plurality of candidate nodes; and
determining an ordinal position of the one of the plurality of candidate nodes in the first resource group.

13. The method of claim 12, further comprising:
activating the first resource group on at least one of the plurality of affinity candidate nodes based on the sorted list.

14. The method of claim 12, wherein determining the composite value further comprises:
determining a number of resource groups that are removed from one of the plurality of affinity candidate nodes when the first resource group is activated on the one of the plurality of candidate nodes;
calculating the net number of outgoing weak affinities satisfied when the first resource group is activated on the one of the plurality of candidate nodes;
calculating the net number of incoming weak affinities satisfied when the first resource group is activated on the one of the plurality of candidate nodes; and
determining an ordinal position of the one of the plurality of candidate nodes in the first resource group's nodelist property.

15. The method of claim 14, wherein the resource groups that are removed comprise a strong affinity for the first resource group.

16. The method of claim 14, wherein a first priority of the pre-defined priority is placed on maximizing the net number of outgoing weak affinities satisfied, a second priority is placed on minimizing the number of resource groups removed from one of the plurality of candidate nodes, a third priority is placed on maximizing the net number of incoming weak affinities satisfied, and a fourth priority is placed on the ordinal position of the affinity candidate node in the nodelist property.

17. A computer system for activating resource groups, comprising:
a processor;
a memory;
a storage device; and
software instructions stored in the memory for enabling the computer system under control of the processor to:
determine a plurality of candidate nodes for the first resource group, wherein each of the plurality of candidate nodes is a separate computer system;
eliminate any of the plurality of candidate nodes that violates a strong affinity of the first resource group to generate a plurality of affinity candidate nodes, wherein the plurality of candidate nodes are eliminated based on a negative affinity type of a resource group affinity of the first resource group to a second resource group, wherein the negative affinity type and a strong affinity indicates that the first resource group must be activated on a different node than the second resource group;
determine a composite value for each of the plurality of affinity candidate nodes;
sort the plurality of affinity candidate nodes based on a pre-defined priority using the composite values to obtain a sorted list;
determine a number of resource groups that are removed from one of the plurality of affinity candidate nodes when the first resource group is activated on the one of the plurality of candidate nodes;
calculate the net number of outgoing weak affinities satisfied when the first resource group is activated on the one of the plurality of candidate nodes;
calculate the net number of incoming weak affinities satisfied when the first resource group is activated on the one of the plurality of candidate nodes; and
determine an ordinal position of the one of the plurality of candidate nodes in the first resource group.

18. The system of claim 17, further comprising:
software instructions stored in the memory for enabling the computer system under control of the processor to activate the first resource group on at least one of the plurality of affinity candidate nodes based on the sorted list.

19. The system of claim 17, wherein a first priority of the pre-defined priority is placed on maximizing the net number of outgoing weak affinities satisfied, a second priority is placed on minimizing the number of resource groups removed from one of the plurality of candidate nodes, a third priority is placed on maximizing the net number of incoming weak affinities satisfied, and a fourth priority is placed on the ordinal position of the affinity candidate node in the nodelist property.

* * * * *